Patented May 9, 1950

2,507,199

UNITED STATES PATENT OFFICE 2,507,199

CONDENSATION PRODUCTS OF FURFURAL AND MONOHYDROXY BENZENES

Leonard K. Eber, Pittsfield, Mass., assignor to General Electric Company, a corporation of New York No Drawing. Application March 20, 1947, Serial No. 736,103

4 Claims. (Cl. 260—45.1)

This invention is concerned with the preparation of resinous condensation products from a mass comprising a monohydroxy benzene (a phenol) and furfural. More particularly, the invention relates to a heat-sensitive, co-condensable composition of matter and process of condensing the same, which composition comprises (1) a monohydroxy benzene, more specifically, an aldehyde-reactable monohydroxy benzene selected from the class consisting of phenol and aldehyde-reactable alkyl-substituted, preferably lower alkyl-substituted, monohydroxy benzenes (for example the various cresols, the various xylenols, etc.) and mixtures of a cresol and phenol, mixtures of a cresol and xylenol, mixtures of phenol, a cresol, and a xylenol, etc., (2) furfural, and (3) a catalyst for the condensation of the aforementioned coreactants (1) and (2) comprising a preformed material selected from the class consisting essentially of melamine, aldehyde-reactable methylol melamines, e. g., dimethylol melamine, trimethylol melamine, etc., and mixtures of melamine and aldehyde-reactable methylol melamines.

The condensation of furfural with aldehyde-reactable monohydroxy benzenes to yield soluble (e. g., soluble in alcohol, acetone, etc.), fusible, resinous products, ordinarily proceeds slowly when volatile, basic or neutral condensation catalysts are employed. This sluggishness of the reaction becomes more pronounced when condensation is attempted between furfural and an aldehyde-reactable lower alkyl-substituted monohydroxy benzene wherein there is a loss of a reactive position on the benzene ring.

In addition, although non-volatile condensation catalysts, for instance, sodium hydroxide, sodium carbonate, etc. do increase to a fair extent the rate of reaction between the coreactants, because such alkaline catalysts are ordinarily solids, it is difficult to remove them from the reaction mass if it is desired to obtain a resinous product having improved electrical properties. Although acidic catalysts, for example, hydrochloric acid, sulfuric acid, etc., have been employed, this type of catalyst materially accelerates the polymerization of the furfural rather than the reaction between, e. g., the phenol or cresol and furfural.

Moreover, the use of acidic or non-volatile basic catalysts is usually undesirable where the condensation products are to be employed for electrical insulation purposes because it is necessary to remove the catalyst completely, e. g., by washing, or by neutralization of the catalyst and removal of the salt formed thereby after the condensation reaction is completed. This procedure is necessary because the presence of only small amounts of these unneutralized catalysts or their salts has a deleterious effect on the electrical properties of the resinous condensation product.

Prior to my invention, volatile organic bases, e. g., aliphatic or aromatic amines, such as triethyl amine, tributyl amine, dimethyl aniline, and triethanol amine, have been employed as catalysts for effecting the condensation between the monohydroxy benzene (i. e., phenol or aldehyde-reactable alkyl-substituted phenols) and furfural. Since such catalysts are volatile they can be removed quite easily after the condensation reaction or during the final heat-conversion of the resinous product. In addition, the presence of small amounts of these catalysts in the condensation product has little effect on the electrical properties of the resinous product. However, excessive times are required to cause the condensation reaction to go to completion. In many cases, it has been found necessary to heat the reaction mass for from 6 to 10 hours or more in order to effect the desired degree of condensation of the monohydroxy benzene with the furfural.

I have now discovered that I can increase the rate of reaction between (1) an aldehyde-reactable monohydroxy benzene (for brevity referred to in the description of this invention and in the claims appended hereto as a "monohydroxy benzene") and (2) furfural within a relatively shorter period of time than has heretofore been possible using other basic organic catalysts. By means of my invention, I am able to obtain the same or a greater degree of condensation between the monohydroxy benzene and furfural in less than one half and, in many instances in less than one quarter of the time required by the use of prior volatile basic condensation catalysts.

In accordance with my invention, I cause the reaction between the monohydroxy benzene and furfural to take place in the presence of a minor proportion or catalytic amount of a condensation catalyst selected from the class consisting of melamine, aldehyde-reactable methylol melamines, and mixtures of two or more of the members of this class. One of the added advantages of my invention lies in the fact that the melamine or aldehyde-reactable methylol melamine enters into and becomes an integral part of the final condensation product without affecting the electrical properties of the resinous product.

My invention is particularly useful in effecting reaction between a mixture of co-condensable ingredients comprising (1) a mass containing a preponderant amount (by weight), e. g., from 55 to 75 per cent, of a mixture of cresols, namely, ortho-cresol, para-cresol and meta-cresol, and a minor amount of xylenols, for example, from 45 to 25 per cent, with smaller amounts of phenol, and (2) furfural.

The method whereby my invention may be practiced can be varied within rather wide ranges depending on the characteristics desired in the final product. I prefer to heat the reaction mixture of the monohydroxy benzene and furfural in the presence of the aforementioned class of catalysts while at the same time removing the water resulting from the condensation between the furfural and the monohydroxy benzene. Another method comprises heating the reactants in the presence of the catalyst for a sufficient length of time to effect condensation and thereafter dehydrating the resin to the desired solids content. Although the reaction may be carried out in a solvent medium, I prefer to effect the reaction in the absence of any such medium.

The temperature ranges within which the reaction may be carried out may also be varied. Usually temperatures of the order of from 125 to 225° C., preferably 150 to 200° C., are employed. However, it is to be understood that higher or lower temperatures may be employed with a resultant increase or decrease in the rate of reaction in accordance with the general law of chemical reactions.

The ratio of furfural to the monohydroxy benzene may also be varied depending upon the particular properties desired in the finished product. Ordinarily these reactants are employed in an amount corresponding to at least one mol of furfural for each mol of the monohydroxy benzene. Thus, I may use, for example, from 1 to 2 or 3 or more mols of furfural for each mol of the monohydroxy benzene.

The amount of melamine or aldehyde-reactable methylol melamine which may be employed may also be varied. Thus, by weight, I may employ from about 0.5 to 15 per cent, preferably from 1 to 12 per cent, catalyst based on the weight of the monohydroxy benzene or mixture of monohydroxy benzenes. Greater amounts of the aforementioned class of condensation catalysts result in too vigorous a reaction. However, for certain applications, such increased rates of reaction may be desired.

Where the water resulting from the condensation of the monohydroxy benzene and furfural is being removed at the same time as the condensation reaction proceeds, it is usually desirable, although not essential, that the heating of the reaction mixture be discontinued when from about 60 to 75 per cent of the calculated theoretical amount of water is obtained if the reaction were to go to completion. Continued heating of the reaction mixture after the above-mentioned amount of water has been obtained usually results in too great a degree of condensation yielding in many cases resinous products which are difficultly soluble or difficultly fusible. It is to be understood, however, that I do not intend to be limited to the above degree of heating since my invention includes products of reaction between a monohydroxy benzene and furfural which, for certain applications, it may be desired should be less soluble and less fusible. In carrying out the reaction it is highly desirable that the reaction mass throughout the course of the condensation be kept at a pH of from about 6.0 to 7.0.

In order that those skilled in the art may better understand how the present invention may be practiced, the following examples are given by way of illustration and not by way of limitation. The cresol mixture employed in the illustrative examples below and identified as "Barrett No. 8 Cresol" contained the following ingredients, by weight: about 3 per cent phenol, approximately 73 per cent of a mixture of cresols containing ortho-cresol, meta-cresol, and para-cresol, and about 24 per cent of a fraction boiling predominantly between 195° to 212° C. and containing small amounts of meta and para-cresols and larger amounts of xylenols, e. g., 1,2,4-xylenol, 1,3,5-xylenol, etc.

EXAMPLE 1

| | Grams |
|---|---|
| Barrett No. 8 Cresol | 216 |
| Furfural | 212 |
| Melamine | 10 |

The above ingredients were charged into a reaction flask which was fitted with a Vigreaux type reflux column to which was attached a Liebig condenser. The reaction flask was immersed in an oil bath. The reaction mass was heated while at the same time removing the water formed during the reaction. The following table shows the course of the reaction. The temperature of the reaction mixture was allowed to rise to approximately the boiling point of furfural and thereafter the temperature was raised slowly as the condensation reaction proceeded until approximately 60 to 70 per cent of the theoretical amount of water (about 36 cc.) was obtained as a distillate. The time in minutes in the following table was measured from the time when visible reaction was noted in the reaction vessel. This procedure was followed in all the succeeding examples.

Table 1

| Time Minutes | Temperature °C. of Reaction Mass | Water Distillate, cc. |
|---|---|---|
| 0 | 161.5 | 0 |
| 15 | 165.0 | 6 |
| 30 | 172.0 | 11 |
| 45 | 180.0 | 17 |
| 60 | 175.0 | 21 |
| 75 | 185.0 | 27 |

In contrast to the above results, when 14.90 grams triethanolamine was substituted for the melamine employed above, and using the same amounts of cresol mixture and furfural it was found that more than 5 hours were required to obtain the same degree of condensation between the cresol mixture and furfural using slightly higher temperature conditions.

EXAMPLE 2

In this example, the same ingredients were employed as in Example 1 with the exception that 20 grams melamine (0.16 mol) was employed in place of the amount of melamine used in Example 1. Approximately 24 cc. of water was obtained after only 50 minutes heating at 160° to 178° C., thus showing the accelerating effect of the melamine.

EXAMPLE 3

| | Grams |
|---|---|
| Barrett No. 8 Cresol | 216 |
| Furfural | 212 |
| Dimethylol melamine | 20 |

The foregoing ingredients were heated together in the same type of apparatus as disclosed in Example 1, while removing the water resulting from the condensation between the cresol mixture and furfural. The following table shows the time, temperature conditions, and amount of distillate at various stages of the reaction.

*Table 2*

| Time Minutes | Temperature, °C. of Reaction Mass | Water Distillate, cc. |
|---|---|---|
| 0 | 142 | 0 |
| 15 | 160 | 5 |
| 30 | 167 | 9 |
| 60 | 171 | 15 |
| 75 | 181 | 20 |
| 90 | 185 | 24 |

EXAMPLE 4

| | Grams |
|---|---|
| Barrett No. 8 Cresol | 216 |
| Furfural | 212 |
| Melamine | 20 |

The reactants together with the melamine were charged into a reaction flask fitted with a water-cooled reflux column and thermometer. The water formed during the reaction was not removed during the course of the condensation. Heating of the flask was effected by means of an oil bath. The temperature of the ingredients was increased to 158° C. at which point the reaction began. The heating was continued until it was determined qualitatively, by means of solids content of the reaction product, that the reaction had essentially gone to completion. Thereafter the reaction mass was dehydrated and about 24 cc. of water were removed. The following table shows the time and the corresponding temperature of the reaction mass during the course of the reaction. It was difficult to maintain the elevated temperature because of the presence of water in the reaction mass.

*Table 3*

| Time Minutes | Temperature, °C. of Reaction Mass |
|---|---|
| 0 | 158 |
| 15 | 146 |
| 30 | 138 |
| 60 | 129 |
| 90 | 120 |
| 150 | 126 |
| 210 | 131 |
| 270 | ¹ 144 |

¹ At this point, analysis of the reaction product showed that it comprised, by weight, about 90 per cent solids.

EXAMPLE 5

| | Grams |
|---|---|
| Barrett No. 8 Cresol | 216 |
| Furfural | 212 |
| Triethanolamine | 20 |

The above ingredients were charged into the same type of apparatus as employed in Example 4. The temperature of the mass was increased to 175° C. at which point the reaction commenced. Heating was continued for about 11 hours after which time analysis of the reaction product showed that it comprised about 62.1 per cent solids. This is to be compared with 90 per cent solids obtained above in Example 4 in about one third the time. The following table shows the course of the reaction:

*Table 4*

| Time Minutes | Temperature, °C. of Reaction Mass |
|---|---|
| 0 | 175 |
| 60 | 175 |
| 120 | 171 |
| 240 | 155 |
| 300 | ¹ 150 |
| 360 | 136 |
| 480 | 134 |
| 600 | 133 |
| 660 | 133 |

¹ After 5 hours heating, the solids content was less than 10 per cent.

EXAMPLE 6

This example illustrates the effect of using melamine as an accelerator for triethanolamine.

| | Grams |
|---|---|
| Barrett No. 8 Cresol | 216 |
| Furfural | 212 |
| Triethanolamine | 14.9 |
| Melamine | 10 |

The above ingredients were charged to an apparatus similar to the one employed in Example 1. The reaction mass was heated up to 162° C. at which temperature the reaction commenced. Water was removed from the reaction mass as it formed as a result of the condensation reaction. The following table shows the various conditions of the reaction including the amount of water distilling from the reaction mass during the course of the reaction.

*Table 5*

| Time Minutes | Temperature, °C. of Reaction Mass | Water Distillate, cc. |
|---|---|---|
| 0 | 162 | 0 |
| 15 | 170 | 10 |
| 30 | 167.5 | 15 |
| 45 | 170 | 20 |
| 60 | 173 | 24 |

EXAMPLE 7

In this example melamine was employed as a condensation catalyst for the reaction between phenol and furfural.

| | Grams |
|---|---|
| Phenol | 188 |
| Furfural | 212 |
| Melamine | 20 |

The reaction was carried out in the same apparatus and in a similar manner as employed in Example 1. The pH of the reaction mass was determined during the course of the reaction by means of a Beckman pH meter. The procedure for determining the pH was as follows: A 1 cc. sample of the reactants was diluted with 4 cc. of a 70–30 alcohol-water solution (pH 6.3). In the case of the resin, a 70–30 acetone-water solution (pH 6.0) was used. Samples of reactants taken previous to reaction (room temperature) had a pH of 6.25–6.3. Samples taken when refluxing had begun had a pH of 6.45–6.5 while the pH of the resin at the end of the reaction had a pH of 6.1–6.15.

The following table shows the various conditions of the reaction during the course of condensation between the phenol and furfural.

Table 6

| Time Minutes | Temperature, °C. of Reaction Mass | Water Distillate, cc. |
|---|---|---|
| 0 | 145 | 0 |
| 15 | 153 | 11 |
| 30 | 175 | 25 |

When 20 grams triethanolamine was substituted for the melamine in the foregoing reaction mixture, the following conditions were found to exist during the course of the reaction:

Table 7

| Time Minutes | Temperature, °C. of Reaction Mass | Water Distillate, cc. |
|---|---|---|
| 0 | 168 | 0 |
| 15 | 170 | 1 |
| 30 | 176 | 3 |
| 60 | 183 | 5.5 |
| 120 | 184 | 11.0 |
| 180 | 187.5 | 17.0 |
| 250 | 191.5 | 24.0 |

The pH of the reactants in this case prior to reaction was 8.8–8.85, the pH of the mass at reflux temperature was 8.85–8.9, while the resin at the end of the reaction had a pH of 7.6.

It is to be understood that the individual cresols or mixtures of these cresols, e. g., ortho-cresol, meta-cresol, and para-cresol, by themselves or with phenol, as well as the different xylenols or mixtures of xylenols, e. g., 1,2,3-xylenol, 1,2,4-xylenol, 1,3,5-xylenol, etc., by themselves or with other aldehyde-reactable monohydroxy benzenes may be used in place of the mixture of cresols and xylenols, or phenol employed in the foregoing examples without departing from the scope of my invention.

It is desired to point out that for the successful practice of my invention, such cyclic nitrogeneous compounds analogous to melamine, e. g. melam, melon, etc., should not be present in the reaction mass since their presence results in a heterogeneous reaction product which is difficultly fusible and soluble and which has little utility.

The soluble, fusible, resinous condensation products disclosed and claimed in my invention may be used in various applications. Among these are as coating compositions, molding compounds, e. g., with various fillers, pigments, etc. They are particularly useful for combining with polyvinyl acetal resins, for example, polyvinyl formal resins, to yield resinous compositions especially suitable for insulating electrical conductors as disclosed in Jackson et al. Patent 2,307,588, issued January 5, 1943, and assigned to the same assignee as the present invention.

What I claim as new and desire to secure by Letters Patent of the United States, is:

1. In the process for effecting condensation between furfural and a monohydroxybenzene selected from the class consisting of phenol, cresols, xylenols, and mixtures thereof, the improvement for increasing the rate of condensation between the reactants which comprises heating a mixture of the latter in the presence of a preformed methylol melamine selected from the class consisting of dimethylol melamine and trimethylol melamine, the weight of the methylol melamine being equal to from 0.5 to 15 per cent, by weight, of the monohydroxybenzene.

2. In the process for effecting condensation between furfural and a monohydroxybenzene selected from the class consisting of phenol, cresols, xylenols, and mixtures thereof, the step for increasing the rate of reaction between these ingredients which comprises heating a mixture of the ingredients in the presence of preformed dimethylol melamine, the latter being present in an amount equal to from 0.5 to 15 per cent, by weight, based on the weight of the mixture of monohydroxybenzenes.

3. In the process for effecting condensation between furfural and a mixture of monohydroxybenzenes containing a preponderant proportion of a mixture of ortho-cresol, meta-cresol and para-cresol, and a minor proportion of a mixture of xylenols, the step for increasing the rate of reaction between the ingredients which comprises heating a mixture of the ingredients in the presence of from 0.5 to 15 per cent, by weight, preformed dimethylol melamine, based on the weight of the mixture of cresols and xylenols.

4. In the process for effecting condensation between furfural and a monohydroxybenzene selected from the class consisting of phenol, cresols, xylenols, and mixtures thereof, the step for increasing the rate of reaction between these ingredients which comprises heating a mixture of the ingredients in the presence of preformed trimethylol melamine, the latter being present in an amount equal to from 0.5 to 15 per cent, by weight, based on the weight of the mixture of monohydroxybenzenes.

LEONARD K. EBER.

REFERENCES CITED

The following references are of record in the file of this patent:

UNITED STATES PATENTS

| Number | Name | Date |
|---|---|---|
| 2,262,728 | Swain et al. | Nov. 11, 1941 |
| 2,328,592 | Widmer et al. | Sept. 7, 1943 |
| 2,430,708 | D'Alelio | Nov. 11, 1947 |
| 2,457,738 | Scott | Dec. 28, 1948 |